United States Patent [19]

Staerzl

[11] 4,410,847

[45] Oct. 18, 1983

[54] VOLTAGE REGULATOR

[75] Inventor: Richard E. Staerzl, Fond du Lac, Wis.

[73] Assignee: Brunswick Corporation, Skokie, Ill.

[21] Appl. No.: 420,555

[22] Filed: Sep. 20, 1982

[51] Int. Cl.³ .............................................. H02J 7/00
[52] U.S. Cl. ........................................ 320/34; 320/61
[58] Field of Search ...................... 320/34, 39, 40, 59, 320/61, 64, DIG. 2; 322/91

[56] References Cited

U.S. PATENT DOCUMENTS

| | | | |
|---|---|---|---|
| 3,576,487 | 4/1971 | Chase | 320/39 |
| 3,708,738 | 1/1973 | Crawford | 320/40 X |
| 3,723,844 | 3/1973 | Cavil | 320/59 |
| 3,800,209 | 3/1974 | Minear | 320/39 X |
| 3,840,796 | 10/1974 | Tozaki | 320/39 X |
| 4,320,335 | 3/1982 | Staerzl | 320/59 |

*Primary Examiner*—William M. Shoop
*Attorney, Agent, or Firm*—O. T. Sessions

[57] ABSTRACT

The invention provides an energy regulating system for regulating the electrical energy generated by the coil (11) of an alternator and used to charge a battery (12). A full wave bridge rectifier circuit (13) supplies direct current to the battery. A comparator (25) is connected to the positive terminal of the battery to provide an output when the battery charge is below the desired level. The output of the comparator is connected through a photo coupler (33) to control the main SCR (18) and thus control the charging current to the battery.

9 Claims, 2 Drawing Figures

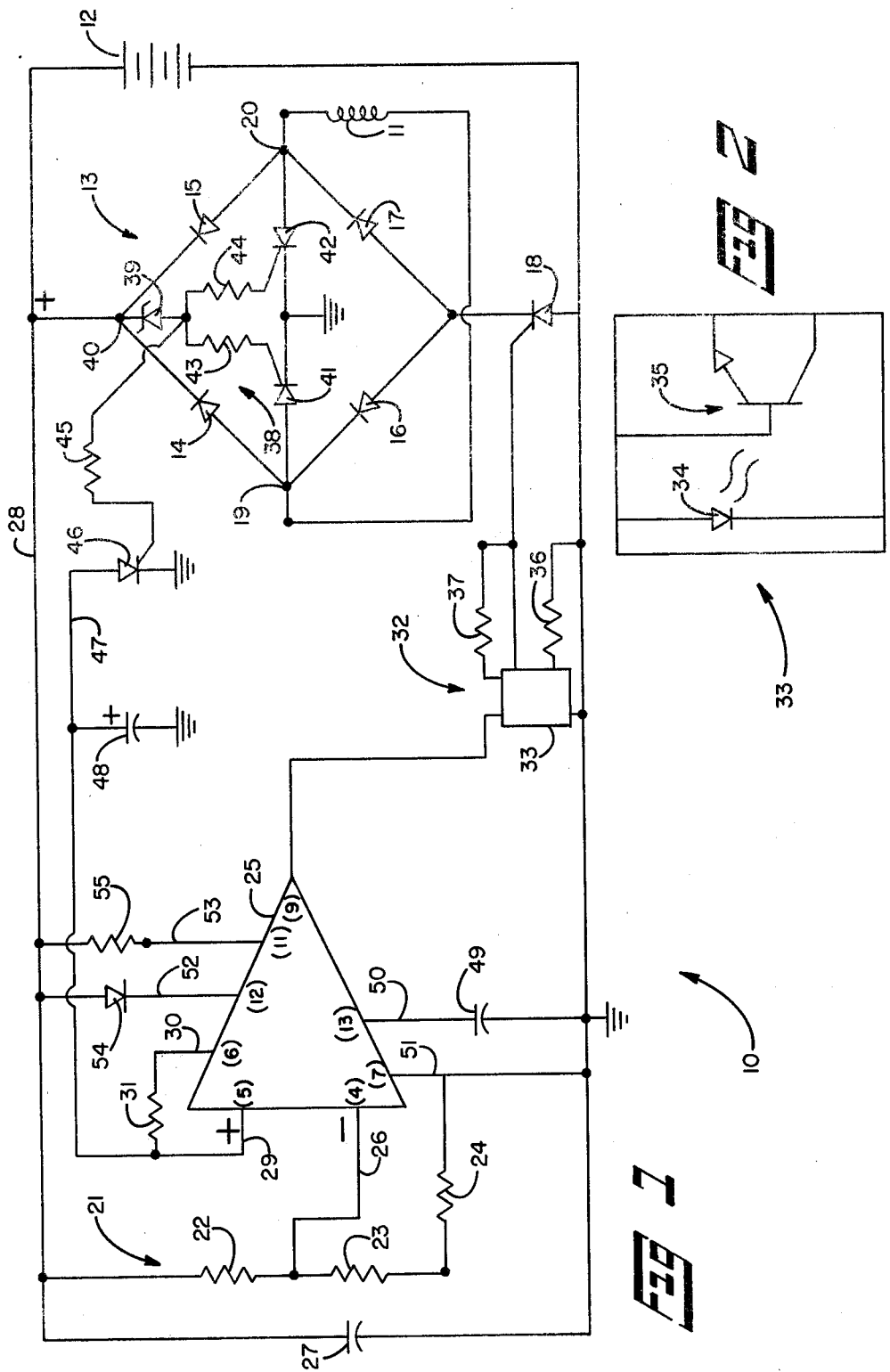

VOLTAGE REGULATOR

TECHNICAL FIELD

This invention relates to battery charging systems and particularly to such systems powered by an alternator.

BACKGROUND ART

Conventional battery charging systems, such as that disclosed in U.S. Pat. No. 4,320,335 to the present inventor, have employed a full wave bridge rectifier for connecting a single phase alternator winding to a battery to convert AC energy to DC energy to charge the battery. These systems require regulators to prevent overcharging of the battery by interrupting current flow to the battery when the battery voltage exceeds a predetermined value. Such regulators require components that can handle high current loads, particularly when the regulator is interrupting current flow. It is further desirable that such regulators be able to handle high energy transients that can occur, for example, when the battery is disconnected or has a loose connection, without damage to the regulator or other devices connected to the system.

DISCLOSURE OF INVENTION

The present invention is particularly directed to an energy regulating system for maintaining a charge on a battery by an electrical energy generating winding of a generator. The system includes a full wave rectifying circuit connected to a first terminal of the battery and to the generator winding. A first switch means is connected to the rectifying circuit for operating between a first condition to supply electrical energy from the winding to the battery and a second condition to operatively interrupt the flow of electrical energy from the winding to the battery. A charge sensor is electrically connected to the battery to provide a charge signal when the battery is charged above a predetermined level and a high voltage sensor is connected to the rectifying circuit to provide a high voltage signal in response to a high voltage above a second predetermined level. A control circuit, connected to the charge and high voltage sensors, produces a control signal in response to the charge and high voltage signals. The control signal is transmitted through a connection means to operate the first switch means, thereby controlling the charging current. By using the control circuit to operate the main switch means in response to both the charge sensor and the high voltage sensor, the use of additional high capacity protective circuit elements to protect the system from high energy transients resulting from such conditions as a loose battery connection are not required.

A second switching means may also be connected to the bridge circuit to be operated by the high voltage sensor to limit the output from the bridge circuit in response to a high voltage output from the bridge circuit. Used in conjunction with the control circuit, the additional switching from an initial high voltage spike, but may be a relatively low capacity device, since it does not need to function continually.

Preferably the control circuit will respond to a high voltage signal from the high voltage sensor by opening the main switch for a limited period. Thus in the event of a loose battery connection, the charging current will be restored after the limited time period has passed. The time period can conveniently be provided by a resistance-capacitance network in the control circuit.

Preferably the invention includes a full wave rectifying bridge circuit having first and second legs including first and second diodes, respectively, having their cathode circuits mutually electrically connected to the first terminal of the battery. Third and fourth legs of the bridge circuit include third and fourth diodes, respectively having their anode circuits mutually connected to the second terminal of the battery through the main switch means. The generator winding is connected between the junction of the first and third bridge legs and the junction of the second and fourth legs. This arrangement allows the main switch means to prevent current flow through any of the bridge legs when the switch means is open, thereby reducing the heat load dissipated in the bridge circuit and reducing the cost of the bridge components.

By using an optical coupling for the connection means between the control circuit and the main switch means the control circuit's output section can be protected from voltage spikes in the rectifier. The optical coupling is particularly useful when the main switch means is a silicon controlled rectifier, since the cathode of the silicon controlled rectifier may reach substantial negative voltages which otherwise would prevent the control signal from switching the silicon controlled rectifier.

BRIEF DESCRIPTION OF THE DRAWINGS

FIG. 1 is a circuit diagram of an energy regulating system according with the invention.

FIG. 2 is a schematic diagram of one of the circuit elements shown in FIG. 1.

BEST MODE FOR CARRYING OUT THE INVENTION

The energy regulating system 10 shown in the figures includes a voltage regulator for regulating the electrical energy generated by the coil 11 of an alternator and used to charge a battery 12. The voltage regulator includes a full wave bridge rectifier circuit 13 connected across the alternator coil 11 to supply direct current to charge the battery 12. The cathodes of the diodes 14 and 15 in the first and second legs of the bridge circuit 13 are connected to the positive terminal of the battery 12 while the anodes of the diodes 16 and 17 in the third and fourth legs are connected to the cathode of a series connected silicon controlled rectifier (SCR) 18 which has its anode connected to the negative terminal of the battery 12. The alternator coil 11 is connected between the junction 19 of the first and third legs of the bridge circuit and the junction 20 of the second and fourth legs. Thus when the SCR 18 is turned on the alternator coil 11 will supply direct current to charge the battery 12.

A charge sensing circuit 21 is connected to the positive terminal of the battery 12 and includes resistors 22, 23 and 24 connected as a voltage divider. An integrated circuit 25 is connected to the charge sensing circuit 21. The integrated circuit 21 operates as a comparator and is available from Texas Instruments under the designation UA723C. An inverting input 26 of the circuit 25 is connected to the voltage divider between resistors 22 and 23. The voltage divider is connected to the system neutral or ground circuit. A stabilizing capacitor 27 is parallel connected to the voltage divider and operates to short circuit high frequency transients which may be received through the charge sensing lead 28.

A non-inverting input 29 of the integrated circuit 25 is connected to a Vref terminal 30 of the integrated circuit 25 through a resistor 31. The Vref terminal 30 thus supplies a highly regulated reference signal to the non-inverting input 29 which is at a substantially constant magnitude independent of temperature variations and of variations in battery potential.

A connecting circuit 32 is connected between the output of the integrated circuit 25 and the gate of the main SCR 18 to control the switching of the main SCR 18. The connecting circuit 32 includes a photo coupler 33 to isolate the integrated circuit 25 from the negative voltage which can be impressed on the cathode of the main SCR 18. The photo coupler 33 includes a light emitting diode 34 having its anode connected to the output of the integrated circuit 25 and its anode connected to ground. The light emitting diode 34 is arranged to illuminate the base of an NPN transistor 35 in the coupler 33. The transistor 35 has its emitter connected to the gate of the main SCR 18 and its collector connected to ground through a current limiting resistor 36. A resistor 37 is also connected between the emitter and base of the transistor 35 to set the gain of the transistor 35 and prevent false turn on due to leakage current from the emitter to the collector of the transistor 35. This arrangement allows the main SCR 18 to have its anode grounded, thus allowing the case to be readily cooled.

A high voltage sensing circuit 38 to protect the system from high voltage transients includes a zener diode 39 having a cathode connected to junction 40 of the bridge circuit 13 and the positive terminal of the battery 12. A pair of SCR's 41 and 42 have their anodes connected to junctions 19 and 20 of the bridge circuit, respectively, and their cathodes connected to ground. The gates of SCR's 41 and 42 are connected through resistors 43 and 44, respectively to the anode of the zener diode 39 to be turned on when the voltage output from the bridge circuit 13 exceeds the breakdown voltage of the zener diode 39. The anode of the zener diode 39 is also connected through a current limiting resistor 45 to the gate of an SCR 46. A connecting circuit 47 connects the anode of the SCR 46 to the non-inverting input 29 of the integrated circuit 25 between the input 29 and the resistor 31. The cathode of the SCR 46 is connected to ground. A capacitor 48 is connected between the connecting circuit 47 and ground to form a resistance-capacitance network with the resistor 31, thus providing a time period after the capacitor 48 is discharged through the SCR 46 before the non-inverting input 29 of the integrated circuit 25 can be brought back to the reference voltage by the output from the Vref terminal 30.

A compensating capacitor 49 is connected to the compensation terminal 50 of the integrated circuit 25 and to ground to compensate for the IR drop in the charging line. The V− terminal 51 is connected directly to the system neutral or ground. The V+ and Vc terminals 52 and 53 of the integrated circuit 25 are connected to the charge sensing circuit 21 ahead of the voltage divider by a connecting circuit including a diode 54 and a resistor 55. The resistor 55 provides voltage protection for the integrated circuit 25 while the diode 54 protects the integrated circuit 25 from reverse battery connection.

OPERATION

In operation, with the battery 12 at less than full charge, the potential of the battery 12 is sensed through the charging sensing circuit 21 at the inverting input 26 of the integrated circuit 25. Since the potential at the inverting input 26 is below the predetermined level established by the reference potential Vref appearing at the non-inverting input 25, the integrated circuit will be switched on and supply an energizing signal through the connecting circuit 32 to the gate of the main SCR 18. With the gate of the main SCR 18 energized the alternator coil 11 functions to supply full wave rectified current to charge the battery 12.

When the battery charge increases to a predetermined level, say 14.2 volts, the potential input at the inverting input 26 will increase above the reference voltage established at the non-inverting input 29 and the integrated circuit 25 will switch from the ON condition to the OFF condition and the main SCR 18 will be turned off and charging current to the battery 12 will cease, preventing overcharging of the battery 12.

In the event the battery 12 is disconnected while the system is operating, the zener diode 39 will act to limit the overvoltage appearing at the output of the bridge circuit 13. When the voltage rises to the breakdown level, preferably about 36 volts, the zener diode 39 will act to supply gate current to the SCR's 41 and 42, thereby shunting the power from the alternator coil to ground. At the same time the zener diode 39 will supply gate current to the SCR 46, thereby discharging the capacitor 48 and reducing the voltage level at the non-inverting input 29 of the integrated circuit 25 to ground. The integrated circuit 25 will turn to the OFF condition and turn off the main SCR 18 to prevent further generation of excess voltage. With the main SCR 18 off, no voltage will appear at the zener diode 39 and consequently the SCR 46 will be turned off. The integrated circuit 25 can then turn on when the capacitor 48 is charged to a sufficiently high level by the output from the Vref terminal 30. Preferably this process will take about 3 seconds, thus allowing time for the SCR's 41 and 42 to cool before the main SCR 18 is turned on again. Thus SCR's 41 and 42 do not have to be sized to carry the continuous output of the alternator.

I claim:

1. An energy regulating system for maintaining a charge on a battery by an electrical energy generating winding of a generator, said regulating system comprising:
    (A) a full wave rectifying circuit electrically connected to a first terminal of said battery and to said winding;
    (B) a first main switch means connected to said rectifying circuit for operation between a first condition to supply electrical energy from said winding to said battery and a second condition to operatively interrupt the flow of electrical energy from said winding to said battery;
    (C) a charge sensing circuit electrically connected to said battery and operating from a first condition to a second condition to provide a charge signal in response to said battery being charged above a predetermined level;
    (D) a high voltage sensor electrically connected to said rectifying circuit and operating to provide a high voltage signal in response to a high voltage above a second predetermined level;

(E) a control circuit electrically connected to said charge sensing circuit and high voltage sensors to produce a control signal in response to said charge and high voltage signals; and (F) a connecting means connected to said control circuit and said first switch means to operate said first switch means in response to said control signal.

2. The energy regulating system defined in claim 1 further comprising:

(G) a second switch means electrically connected to said bridge circuit and to said high voltage sensor to operate said second switch means in response to a high voltage signal from said high voltage sensor and limit the output from said bridge circuit.

3. The energy regulating system defined in claim 2 wherein said control circuit responds to said high voltage signal to operate said first switch means between said first and second conditions for a limited time period.

4. The energy regulating system defined in claim 3 wherein said control circuit includes a resistance-capacitance network to provide said time period.

5. The energy regulating system defined in claim 1 wherein said full wave rectifying circuit includes a bridge circuit having first and second legs including first and second diodes, respectively, having cathode circuits mutually electrically connected to said first terminal of said battery and third and fourth legs including third and fourth diodes, respectively, having anode circuits mutually electrically connected to a second terminal of said battery through said first switch means, said winding having a first end electrically connected to a first connection joining said first and third bridge legs and a second end electrically connected to a second connection joining said second and fourth bridge legs.

6. The energy regulating system defined in claim 1 wherein said connecting means includes an isolating coupling between said control circuit and said first switch means to prevent feedback from said first switch means to said control circuit.

7. The energy regulating system defined in claim 6 wherein said connecting means includes a light emitting diode electrically connected to said control circuit to produce an optical signal in response to said control signal and a photo transistor electrically connected to said first switch means an optically coupled to said light emitting diode to operate said first switch means in response to said optical signal.

8. The energy regulating system defined in claim 7 wherein said connecting means further includes a resistor coupled between the emitter and the base of said photo transistor to set the gain of said transistor.

9. The energy regulating system defined in claim 8 wherein said main switch means includes a silicon controlled rectifier.

* * * * *